United States Patent [19]

Somal

[11] 4,419,902
[45] Dec. 13, 1983

[54] CONSTANT STRAIN LOAD CELL

[75] Inventor: Hardev S. Somal, LaPorte, Ind.

[73] Assignee: Maatschappij Van Berkel's Patent N.V., Leidschendam, Netherlands

[21] Appl. No.: 308,113

[22] Filed: Oct. 2, 1981

[51] Int. Cl.³ .............................................. G01L 1/22
[52] U.S. Cl. ................................. 73/862.65; 338/5; 177/211; 177/229
[58] Field of Search ..................... 73/862.65; 338/5; 177/211, 229

[56] References Cited

U.S. PATENT DOCUMENTS

| 3,213,400 | 10/1965 | Gieb | 73/862.65 |
| 4,089,217 | 5/1978 | Rahav et al. | 73/862.65 |
| 4,181,011 | 1/1980 | Brendel | 73/862.65 |

FOREIGN PATENT DOCUMENTS 1125326 7/1966 United Kingdom .
2051373 1/1981 United Kingdom .

Primary Examiner—Charles A. Ruehl
Assistant Examiner—Brian Tumm
Attorney, Agent, or Firm—Lloyd L. Zickert

[57] ABSTRACT

A constant strain load cell for measuring forces applied to the cell which includes a parallelogram shaped body having fixed and movable end constraints interconnected by upper and lower flexures with flexing areas at the opposite ends of the flexures functioning as sensing beams and on which strain gages are mounted. The flexing areas are formed so that bending stresses caused by applied loads are maintained constant over the flexing areas or regions. The load cell can be easily machined or extruded and the capacity can easily be varied dependent only on the overall size.

7 Claims, 6 Drawing Figures

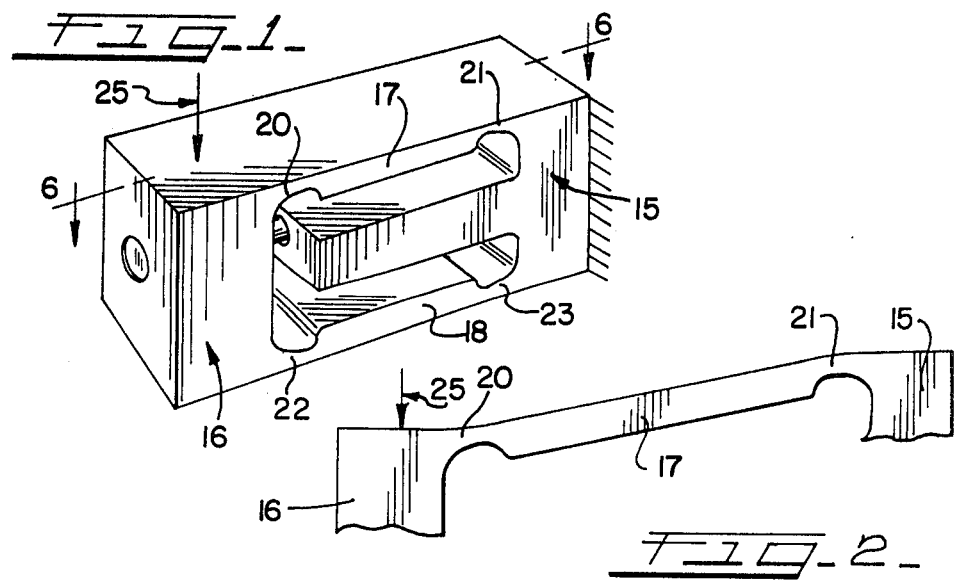
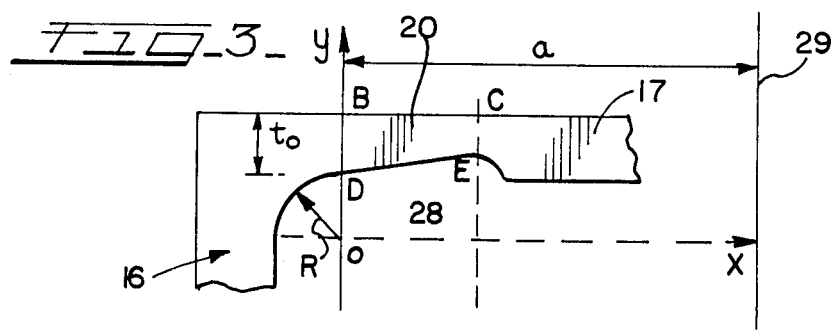
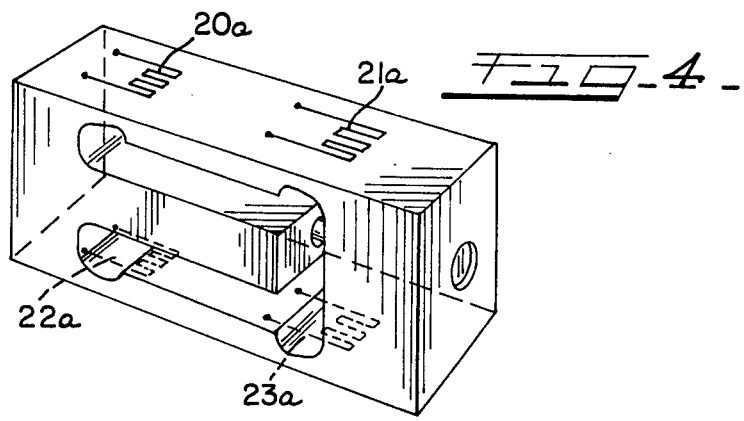

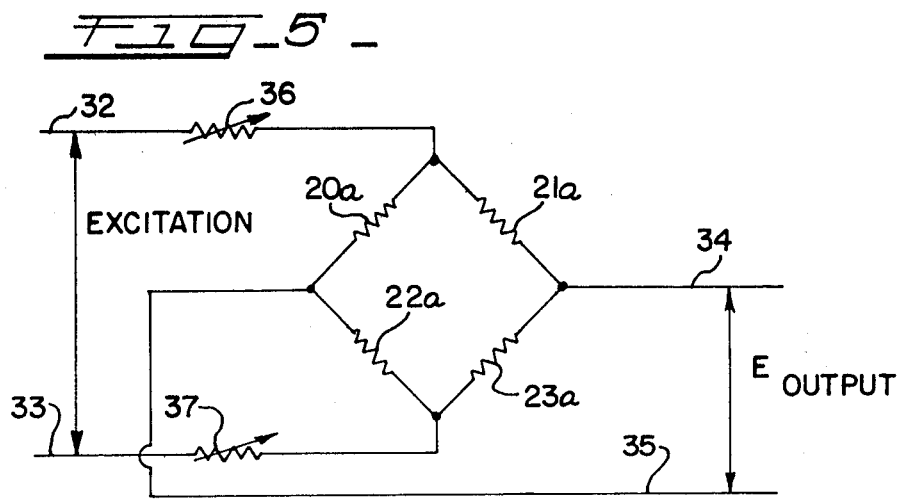
FIG_5
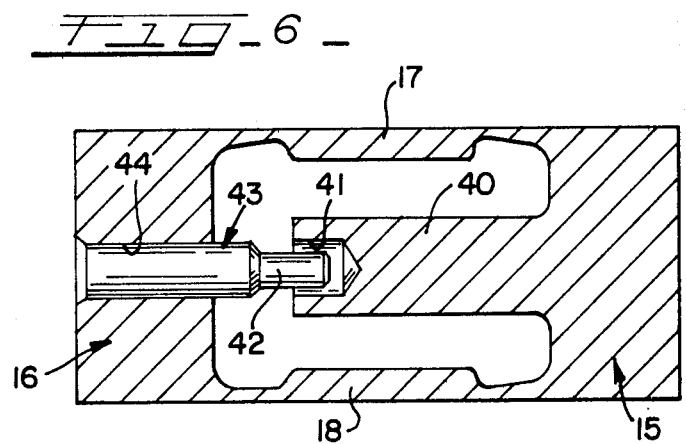
FIG_6

CONSTANT STRAIN LOAD CELL

This invention relates in general to a strain gage load cell for measuring forces applied to the cell and which includes constant strain flexing areas serving as sensing beams.

Heretofore, many types of load cells have been developed, several of which are of the parallelogram type. Exemplary is the load cell illustrated in U.S. Pat. No. 4,181,011, which includes a single sensing beam on which four strain gages are mounted and connected in a Wheatstone bridge circuit configuration. This load cell requires the need to form a separate sensing beam with difficult-to-machine flexing points and sensing beam structure. The accuracy of such a load cell is sometimes impaired when serious thermal gradient conditions exist along the axis of the sensing beam, resulting in extended warm-up period. These problems also cause impairment of the creep characteristics where a load may be maintained on the cell for a long period of time. Moreover, because of the single and relatively small sensing beam, the excitation voltage for the strain gages must be maintained at a low level in order to avoid thermal instability problems. Further, the application of the strain gages on a common surface makes it more sensitive to thermal gradients resulting from outside heat. Thus, the output from such a load cell is very sensitive to thermal gradients.

The present invention obviates the above problems in that it provides a parallelogram type load cell which includes four spaced-apart constant strain sensing beams at the flexing areas of the upper and lower flexures on which strain gages are mounted, thereby essentially eliminating any thermal gradient problems. Further, a thermal gradient situation in the flexing areas will cancel each other, thereby preventing impairment of the accuracy of the load cell and rendering the load cell immune to thermal gradients from outside heat. Moreover, the load cell of the present invention allows a single strain gage to be mounted in a larger flexing area which in turn permits a higher level excitation voltage that enables the use of low stress levels to obtain the same output. The higher excitation voltages can be used without overheating the sensing beams. Further, the lower level of stresses encountered in the flexing area enhances the life of the load cell in that the strain gages are subjected to lower stress levels as well as the backing material for the strain gages and the adhesive for mounting the strain gages to the backing material and the backing material to the sensing beam. These factors all contribute to less creep and enhanced life. The use of the flexing areas on the upper and lower flexures eliminates the need for a separate beam and reduces to a minimum the number of critical dimensions required for making the load cell. Because of the ability to use lower stress levels, the linearity of the load cell is improved to provide more accurate weight measurements.

While it has been known to provide a load cell with a parallelogram type configuration and the use of flexing areas as sensing beams, such as in U.K. published patent application No. GB 2,051,373A, the flexing areas are not shaped to give a constant stress distribution in the regions where strain gages are mounted. This requires the need for very accurate location of individual gages to achieve proper cancellations of extraneous effects on the output of the load cell.

Another load cell of the parallelogram type is shown in U.S. Pat. No. 4,089,217 and which has constant stress dual guided beams. This cell has cylindrical and varying width portions which are expensive to machine. Further, it cannot be extruded.

The present invention overcomes the disadvantages in such load cells in providing a more ruggedly constructed load cell that is immune to thermal gradients and which includes flexing areas that are ruggedly constructed and generally tapered toward the midpoint of the flexures and are also used as sensing beams. Since the end constraints, flexures and flexing areas are of the same width, the load cell can be easily machined or even extruded. Further, the capacity may be easily varied by increasing or decreasing the dimensions of the cell. Thus, the load cell of the present invention wil have longer life and provide more accurate measurements and can be of simple construction and be manufactured more economically.

It is therefore an object of the present invention to provide a new and improved load cell having constant strain characteristics which is rugged in construction and immune to thermal gradients resulting either from excitation voltage of the strain gages or from outside heat.

Another object of this invention is in the provision of an improved constant strain load cell of the parallelogram type having flexing areas on the upper and lower flexures which serve as sensing beams, thereby eliminating the need to provide a separate sensing beam and where the flexing areas are constructed to provide a constant stress along its length wherein equal tensile and compressive strains along the length of the flexing areas are measurable by the strain gages.

Another object of the present invention is in the provision of constant strain in the flexing areas, thus eliminating the requirement of accurately locating each individual gage for achieving the improved output accuracy.

A further object of the present invention is in the provision of a constant strain load cell of the parallelogram type having flexing areas at the ends of the upper and lower flexures and which has the thickness of the flexing areas varied along their length such that the thickness of the areas are tapered toward the midpoint of the flexures.

A still further object of the present invention is to provide a constant strain load cell having uniformly stressed sensing beams, thereby resulting in significantly improved creep characteristics and where the load cell is ruggedly constructed and immune to thermal gradient conditions, while providing highly linear and repeatable output for better accuracy.

A further object of the present invention is in the provision of a parallelogram type constant strain sensing beam utilizing flexing areas at the opposite ends of the upper and lower flexures for sensing beams and being constructed to have materially improved creep, hysteresis, and off-center loading characteristics.

A further object of this invention is in the provision of a unitary parallelogram type constant strain load cell with flexing areas at the upper and lower flexures serving as sensing beams on which strain gages are mounted, thereby eliminating the need for a separate beam and reducing to a minimum the number of critical dimensions needed for constructing the load cell.

Another object of the present invention is to provide a load cell that can be manufactured to different load capacities simply by changing the thickness of the stock from which it is made.

Another object of the present invention is to provide a load cell that can also be produced by other cost effective manufacturing techniques such as extrusion.

Another object of the present invention is to provide a constant strain load cell of the parallelogram type having a built-in overload protection mechanism that protects the cell against accidental shock loads and other overloads.

Other objects, features and advantages of the invention will be apparent from the following detailed disclosure, taken in conjunction with the accompanying sheets of drawings, wherein like reference numerals refer to like parts, in which:

FIG. 1 is a perspective view of the constant strain load cell according to the present invention;

FIG. 2 is an enlarged side elevational and somewhat diagrammatic view of the upper flexure in exaggerated form subsequent to the application of a loading force;

FIG. 3 is a greatly enlarged and somewhat diagrammatic side elevational view of one of the flexing areas to illustrate the shape of the flexing area and explain how it is constructed;

FIG. 4 is a perspective view of the load cell of FIG. 1 illustrating the manner in which the strain gages are mounted on the flexing areas;

FIG. 5 is an electrical schematic diagram of the Wheatstone bridge circuit for measuring the resistance changes of the strain gage resistors due to stresses induced in the flexure members upon the application of a load; and FIG. 6 is a longitudinal sectional view taken substantially along line 6—6 of FIG. 1 to illustrate the overload protection system employed.

Referring now to the drawings, the load cell of the present invention is formed from a single block of material by machining the block to define the load cell elements. It should be appreciated that such a load cell is usually made from a suitable aluminum alloy and milled on a numerically controlled milling machine, even though its simple design lends itself easily to other mass production techniques such as extrusion.

The load cell includes massive end constraints interconnected by flexure members in a parallelogram fashion. Generally, the cell includes a fixed end constraint 15, a movable end constraint 16, an upper flexure 17 and a lower flexure 18, all of the same width. Flexing areas 20 and 21 are provided at the opposite ends of the upper flexure 17, and flexing areas 22 and 23 are provided at opposite ends of the lower flexure 18. The flexing areas or regions 20, 21, 22 and 23 serve as sensing beams on which are mounted strain gages for responding to the stresses resulting from a force being applied to the movable end constraint 16, such as illustrated by the arrow 25. As shown particularly in FIG. 4, strain gages or strain gage grids 20a, 21a, 22a and 23a are respectively mounted on the flexing areas 20, 21, 22 and 23. Upon the application of a load or force to the movable end constraint 16, tensile stresses will be induced in the flexing areas 21 and 22, while compressive stresses will be induced in the flexing areas 20 and 23. The flexing areas are sized such that the exact placement of the strain gage is not critical. The gage is much smaller than the area on which it is placed.

In the flexed form the flexures take an "S" shape, such as illustrated by the flex areas 20 and 21 of flexure 17 in exaggerated form in FIG. 2, causing equal but opposite stresses at the flex areas at the opposite ends of the flexures. The section modulus varies along the flexures in such a way that the flexural stresses are constant. It can be appreciated that most of the flexural stresses are concentrated at the ends of the flexures in the flexing areas. Thus, the stresses at the ends of the flexures are maximum, constant and of opposite nature. As such, the creep characteristics of the load cell are materially improved and the placement of the strain gages over the flexing areas is not critical. It is only important that the gages be within the boundaries of the flexing area. Further, the constant nature of the stresses encountered enhances the cancellation of the thermal gradient and off-center loading effects among the flexing areas so as not to impair the output of the load cell.

Another factor which contributes to the improvement of the creep characteristics of the load cell is the large sensing beam sizes which allow the excitation voltage on the Wheatstone bridge to be proportionally higher without causing any overheating. Therefore, for a given output, a proportionally lower level of stresses in the flexing areas, the strain gages, and the materials that attach the strain gages to the flexing areas is possible that results in a dramatic decrease in the contribution to total creep of the load cell.

It will be appreciated that the flexures 17 and 18 are relatively compliant members of the load cell. The thickness of the flexures at their ends is varied to define the constant stress flexing areas or regions that serve as sensing beams. Referring specifically to FIG. 3, the thickness tapers toward the midpoint of the flexures and is sized according to the following equation $$t_x = t_o \sqrt{\frac{a-x}{a}}$$

where $t_x$ equal the thickness of the flexing area at distance x from the y coordinate, $t_o$ equals the thickness of the flexing area at x=0, a equals the distance between point B and the midpoint of the flexure, and x equals the distance along the flexing area from the y coordinate.

Referring particularly to FIG. 3, the x, y coordinate axes are positioned such that the intersection of the axes is at the center point of the curve with radius R which merges the movable end constraint 16 and the flexure 17. The y coordinate line across the flexure 17 at line BD marks the left end of the flexure 17 and the left end of the flexing area 20, while the vertical line CE marks the right end of the flexing area 20. The dimension BC is conveniently selected to be slightly larger than the length of the strain gage grid. Thus, the flexing area 20 is that part of the flexure between lines BD and CE. The upper surface of the flexure is flat, while the lower face 28 is along the curve of the above mentioned equation. The vertical line 29 marks the midpoint of the flexure 17 from which the distance a is measured to the y coordinate. Thus, the thickness of the flexing region 20 identified as $t_o$ is equal to BD at the y coordinate and varies toward the midpoint of the flexure to its narrowest point at CE. The face 28 is curvate between the points DE according to the equation. The point where the curve or profile of face 28 ends is arbitrarily selected, but it can be appreciated that the flexing area essentially tapers from the movable end constraint 16 to the midpoint of the flexure 17. Similarly, the other flexing areas taper toward the midpoint of the flexures, as can be particularly appreciated by the side elevational view of FIG. 6.

As seen in FIG. 5, the strain gage resistors 20a, 21a, 22a and 23a are connected in a Wheatstone bridge circuit whereby an excitation voltage is applied across terminals 32 and 33. As the resistance of the strain gages changes due to the tensile and compressive stresses in the flexing areas 20, 21, 22 and 23, the bridge balance is disturbed which results in a net potential output between terminals 34 and 35 proportional to the applied load to the load cell. Adjustable resistors 36 and 37 may be provided to balance the bridge prior to the application of any load.

The overload protection mechanism which forms no part of the present invention and is more particularly disclosed in my copending application is illustrated particularly in FIG. 6 wherein an overload arm or beam 40 extends from the fixed end constraint 16 in parallel relation between the upper and lower flexures 17 and 18 and toward the movable end constraint 16, terminating in spaced relation from the movable end constraint. A blind hole 41 is provided in the free end of the arm 40 for freely receiving the necked down end portion 42 of a pin 43 which is press-fit into the hole 44 formed in the movable end constraint 16. The gap between the necked down section 42 of the pin and the blind hole 41 allows free movement of the movable end constraint 16 but stops movement at a given deflection between the end constraints such as to protect the load cell against overload conditions which would damage the cell.

It can be appreciated that the present invention provides an improved constant strain load cell that can be economically manufactured in various capacities.

It will be understood that modifications and variations may be effected without departing from the scope of the novel concepts of the present invention, but it is understood that this application is to be limited only by the scope of the appended claims.

The invention is hereby claimed as follows:

1. In a constant strain load cell including a fixed end constraint, a movable end constraint, upper and lower flexures interconnecting the end constraints in parallelogram form, said end constraints being massive and of constant width therealong, said flexures being compliant and of constant width therealong, flexing areas at opposite ends of the flexures, and strain gages mounted at the flexing areas, the improvement being in the flexing areas which are of less thickness than the main body of the flexures and of uniform tapered thickness along their length from one end to the other end thereof such as to define constant stress areas along their entire length whereby bending of the areas will cause constant and equal tensile and compressive stresses along their length.

2. In a constant strain load cell including a fixed end constraint, a movable end constraint, upper and lower flexures interconnecting the end constraints in parallelogram form, said end constraints being massive and said flexures being compliant, the width of the end constraints and flexures being the same, flexing areas at opposite ends of the flexures, and strain gages mounted at the flexing areas, the improvement being in the flexing areas which are of less thickness than the main body of the flexures and of uniform tapered thickness along their length from one end to the other end thereof such as to define constant stress areas along their entire length whereby bending of the areas will cause constant and equal tensile and compressive stresses along their length.

3. The load cell of claim 2, wherein the flexing areas taper toward the midpoint of the flexures according to a given formula.

4. The load cell of claim 3, wherein the taper is a function of the equation $$t_x = t_o \sqrt{\frac{a-x}{a}}$$

where $t_x$ is the thickness of the flexing area along an x coordinate which parallels said flexures from a y coordinate which is perpendicular to the x coordinate, $t_o$ is the thickness at the point where $x=0$, a is the length from the y coordinate to the midpoint of the flexure and x is the distance along the flexing area from the y coordinate.

5. The load cell of claim 4, wherein the y coordinate is at the end of the flexing area remote from the midpoint of the flexure.

6. In a constant strain load cell including a fixed end constraint, a movable end constraint, upper and lower flexures interconnecting the end constraints in parallelogram form, the width of the end constraints and flexures being the same, flexing areas at opposite ends of the flexures, and strain gages mounted at the flexing areas, the improvement being in the flexing areas which are of a thickness less than that of the flexures according to the equation $$t_x = t_o \sqrt{\frac{a-x}{a}}$$

where $t_x$ is the thickness of the flexing area along an x coordinate which parallels the flexures from a y coordinate which is perpendicular to the x coordinate, $t_o$ is the thickness at the point where $x=0$, a is the length from the y coordinate to the midpoint of the flexure and x is the distance along the flexing area from the y coordinate.

7. The load cell of claim 6, wherein the flexing areas taper toward the midpoint of the flexures.

* * * * *